(12) United States Patent
Blanckenfiell et al.

(10) Patent No.: US 11,913,505 B2
(45) Date of Patent: Feb. 27, 2024

(54) METHOD AND SYSTEM FOR DISENGAGING A CLUTCH DURING ENGINE SHUTDOWN AND VEHICLE COMPRISING SUCH A SYSTEM

(71) Applicant: Volvo Truck Corporation, Gothenburg (SE)

(72) Inventors: Magnus Blanckenfiell, Hisings Kärra (SE); Fredrik Karpenman, Västra Frölunda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/928,090

(22) PCT Filed: Jun. 1, 2020

(86) PCT No.: PCT/EP2020/065118
§ 371 (c)(1),
(2) Date: Nov. 28, 2022

(87) PCT Pub. No.: WO2021/244729
PCT Pub. Date: Dec. 9, 2021

(65) Prior Publication Data
US 2023/0220888 A1    Jul. 13, 2023

(51) Int. Cl.
*F16D 48/06*    (2006.01)

(52) U.S. Cl.
CPC .... *F16D 48/06* (2013.01); *F16D 2500/10412* (2013.01); *F16D 2500/3067* (2013.01);
(Continued)

(58) Field of Classification Search
CPC .......... F16D 48/06; F16D 2500/10412; F16D 2500/3067; F16D 2500/30808;
(Continued)

(56) References Cited

U.S. PATENT DOCUMENTS

| 2003/0119628 A1 | 6/2003 | Jager et al. |
| 2007/0087897 A1 | 4/2007 | Kitamura |

(Continued)

FOREIGN PATENT DOCUMENTS

| CN | 203202062 U | 9/2013 |
| GB | 2210127 A | 6/1989 |

OTHER PUBLICATIONS

International Search Report and Written Opinion of the International Searching Authority, PCT/EP2020/065118, dated Oct. 21, 2020, 12 pages.

*Primary Examiner* — David R Morris
(74) *Attorney, Agent, or Firm* — Sage Patent Group

(57) ABSTRACT

A system for controlling a clutch in a heavy vehicle including an internal combustion engine and an automated mechanical transmission, where the engine is running, the clutch is engaged and the transmission is in neutral, including an electronic control unit adapted to receive a request to shut down the engine, to disengage the clutch of the transmission, and to shut down the engine, where the electronic control unit is adapted to reengage the clutch when the rotation of the engine and the rotation of the transmission input shaft is zero, and to actively slow down rotation of the transmission input shaft by the use of a brake device if the stop time for the transmission input shaft exceeds a predefined time interval. The advantage of the invention is that vibrations and noise are reduced during shut down of the engine.

15 Claims, 3 Drawing Sheets

(52) U.S. Cl.
CPC .............. *F16D 2500/30808* (2013.01); *F16D 2500/30816* (2013.01)

(58) Field of Classification Search
CPC ... F16D 2500/30816; F16D 2500/1083; F16D 2500/1112; F16D 2500/3166; F16D 2500/50293; F16D 2500/5122; F16D 2500/7041; F16D 2500/30426; F16D 2500/30415; F16D 2500/70402–70444
See application file for complete search history.

(56) References Cited

U.S. PATENT DOCUMENTS

| | | | |
|---|---|---|---|
| 2009/0255743 A1* | 10/2009 | Dilzer | B60L 7/12 180/65.265 |
| 2009/0264253 A1 | 10/2009 | Herchick et al. | |
| 2015/0032358 A1 | 1/2015 | Amemiya | |
| 2015/0274146 A1 | 10/2015 | Doering et al. | |
| 2018/0010320 A1 | 1/2018 | Yoshikawa et al. | |

\* cited by examiner

METHOD AND SYSTEM FOR DISENGAGING A CLUTCH DURING ENGINE SHUTDOWN AND VEHICLE COMPRISING SUCH A SYSTEM

CROSS REFERENCE TO RELATED APPLICATIONS

This application is a 35 U.S.C. § 371 national stage application of PCT International Application No. PCT/EP2020/065118 filed on Jun. 1, 2020, the disclosure and content of which is incorporated by reference herein in its entirety.

TECHNICAL FIELD

The present invention relates to a method and system for disengaging a clutch in a transmission of a heavy vehicle before the engine is shut down. This will reduce noise and vibrations.

BACKGROUND ART

Heavy vehicles often comprises an internal combustion engine for the propulsion of the vehicle and can be equipped with an Automated Mechanical Transmission (AMT) having a normally closed clutch, where it is important not to keep the clutch in disengaged position for too long time. A typical case is when the vehicle is parked with the engine on idle or engine shut off. The reason is to reduce wear on the clutch release bearing. This means that as soon as the driver pulls the parking brake and move the gear lever to neutral, the AMT will be put in neutral and the clutch will be engaged in order to prepare it for a state where it can remain for a long time without any problem.

When the driver has parked the vehicle and requests to shut-off the engine, he or she turns the ignition key to off (or presses a stop button). As described above, normally the clutch is engaged and the engine is connected with the clutch disc and the input shaft of the AMT. When the engine approaches zero rotational speed during shut down it will start to shake and rattle. Since the engine and AMT are connected, this shaking and rattling will be transferred to the AMT, which will cause some noise and vibrations.

There is thus room for a system and method that reduces vibrations during shut down of the engine of a vehicle.

DISCLOSURE OF INVENTION

An object of the invention is therefore to provide a system for reducing vibrations in a driveline of a vehicle during shut down of an internal combustion engine. A further object of the invention is to provide a method for reducing vibrations in a driveline of a vehicle during shut down of an internal combustion engine. A further object of the invention is to provide a vehicle comprising such a system. An object is also to provide a computer program and a computer program product adapted to perform the steps of the method.

The solution to the problem according to the invention is described in the characterizing part of claim 1 regarding the system, in claim 7 regarding the method and in claim 13 regarding the vehicle. The other claims contain advantageous further developments of the inventive system and method. Claims for a computer program and a computer program product are also enclosed.

In a system for controlling a clutch in a heavy vehicle comprising an internal combustion engine and an automated mechanical transmission, where the engine is running, the clutch is engaged and the transmission is in neutral, the system comprising an engine speed sensor, a transmission speed sensor, an electronic control unit adapted to receive a request to shut down the engine, to disengage the clutch of the transmission, and to shut down the engine, the object of the invention is achieved in that the electronic control unit is adapted to reengage the clutch when the rotation of the engine and the rotation of the transmission input shaft has reached zero, and to actively slow down rotation of the transmission input shaft by the use of a brake device if the stop time for the transmission input shaft exceeds a predefined time interval.

By this first embodiment of a method for controlling a clutch in a heavy vehicle, a method is provided, where vibrations are reduced in a driveline during shut down of the engine. In the system according to the invention, the transmission input shaft of the gearbox is disengaged from the engine during shut down of the engine. The vibrations caused by the engine during shut down of the engine are thus not transferred to the transmission, which reduces the vibrations and noise of the driveline. The reduction of vibrations and noise will also enhance the quality impression of the vehicle.

The method is applicable on all automated mechanical transmissions comprising a clutch. As mentioned the gearbox will be in neutral when the engine is shut down, but the input shaft will still be connected to the engine through the engaged clutch. It is further of advantage to keep the clutch engaged as much as possible, in order to reduce wear of the clutch release bearing. Thus, the clutch will normally always be engaged when the gearbox is in neutral.

When the request to shut down the engine is issued, the clutch is disengaged. As soon as the engine and the transmission input shaft stops rotating, the clutch will be reengaged again. The rotational speed of the engine and the rotational speed of the transmission input shaft are thus monitored, such that the clutch is not reengaged when one or both are rotating.

In some cases, the transmission input shaft may rotate longer than the engine, i.e. the transmission input shaft rotates when the engine has stopped rotating. In this case, the rotation of the transmission input shaft can be actively reduced by either engaging the clutch slowly and/or partly in order to function as a brake, or by engaging a gearbox brake, e.g. a countershaft brake. When the transmission input shaft has stopped rotating, the clutch can be completely engaged.

In one example, the clutch is disengaged when the engine speed is below a predefined value. The rotational speed of the engine is monitored, and the clutch is disengaged when the rotation of the engine has slowed down some. In one example, the predefined speed value is below the set idle speed of the engine. The set idle speed of a truck may e.g. be in the interval between 600 to 800 rpm, depending e.g. on if a power take off is used, or driver preferences.

In a method for controlling a clutch in a heavy vehicle comprising an internal combustion engine and an automated mechanical transmission, where the engine is running, the clutch is engaged and the transmission is in neutral, the steps of: receiving a request to shut down the engine, disengaging the clutch of the transmission, shutting down the engine, monitoring the rotational speed of the engine, monitoring the rotational speed of the transmission input shaft, if the stop time of the transmission input shaft exceeds a predefined time interval, then actively slow down the transmission input shaft until the rotational speed of the transmission input shaft is zero, and reengaging the clutch completely when the rotational speed of the engine and the rotational speed of the transmission input shaft is zero, are comprised.

By this first embodiment of the method, the method is able to reduce vibrations and noise from the driveline caused by the shut down of the engine. If the stop time of the transmission input shaft is longer than a predefined time interval, the transmission input shaft is slowed down actively.

BRIEF DESCRIPTION OF DRAWINGS

The invention will be described in greater detail in the following, with reference to the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
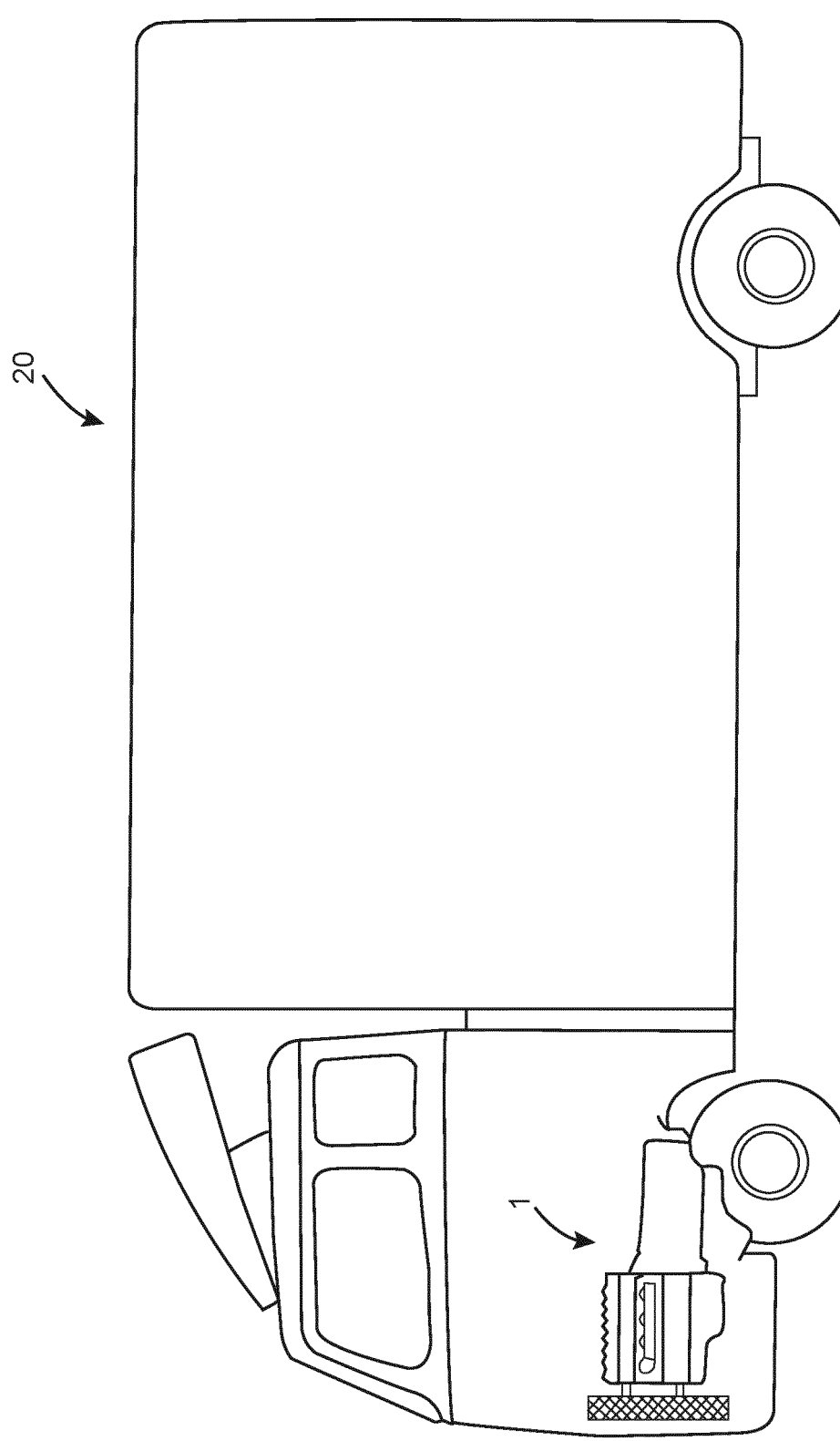
FIG. 1 shows a schematic heavy vehicle.

FIG. 1 shows a schematic heavy vehicle 20 provided with an inventive clutch control system 1. The vehicle is here a truck, but the clutch control system can be used in any heavy vehicle comprising an internal combustion engine and a transmission having a gearbox with an automated clutch, such as busses or construction equipment.

Figure 2:
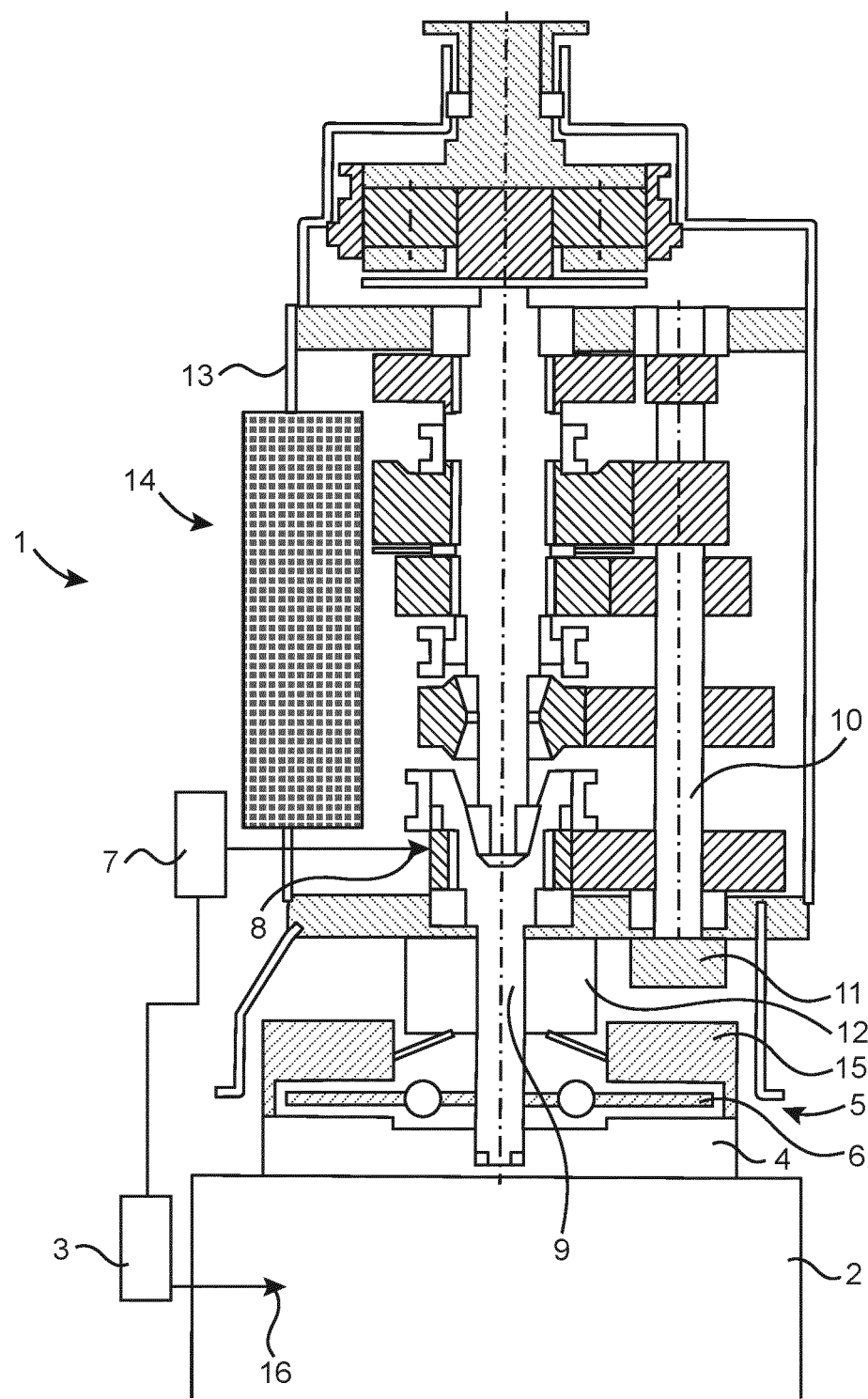
FIG. 2 shows a schematic clutch control system according to the invention.

FIG. 2 shows a schematic clutch control system 1 for a heavy vehicle. The clutch control system 1 comprises an internal combustion engine 2 and a transmission 14 comprising a clutch 5 and a gearbox 13. The internal combustion engine 2 is provided with a rotational speed sensor (16) adapted to measure the rotational speed $e_r$ of the engine. The engine is further provided with an electronic control unit (ECU) 3, which is adapted to control various functions of the engine and to communicate with other engine ECU's and the other ECU's of the vehicle. The engine is coupled to a transmission 14, and is connected to a gearbox 13 through the clutch 5.

The pressure plate 15 of the clutch 5 will press the clutch disc 6 against the flywheel 4 of the engine when the clutch is engaged. This will connect the engine with the transmission input shaft 9 of the gearbox 13. The rotation of the engine will be transferred through the gears of the gearbox to a propeller shaft and to the wheels of the vehicle. The transmission is provided with a transmission ECU 7 adapted to control the transmission and to communicate with the other ECU's of the vehicle. The transmission ECU will control the clutch and the gear change of the gearbox. A transmission actuator 12, which may be a hydraulic actuator, is used to move the pressure plate to and from the clutch disc.

When the engine is to be shut down, e.g. when a driver wants to park the vehicle, he first stops the vehicle and puts the gearbox in neutral. He may then turn the ignition key or press a stop button, which sends a signal to the engine ECU that the engine is to be shut down. This signal will also be received by the transmission ECU, which disengages the clutch by activating the transmission actuator 12. This disconnects the flywheel of the engine from the transmission input shaft of the transmission. The engine is shut down, e.g. by stopping the fuel supply to the engine. The rotation of the engine will slow down due to internal friction. When the rotation of the engine slows down, there will be some vibrations and some shaking before the rotation stops completely, especially just before the engine stops rotating completely. Since the engine is disconnected from the transmission input shaft, these vibrations are not transferred to the gearbox, which will reduce the overall noise from the vehicle.

In one example, the clutch is disengaged when the engine speed is below a predefined value. The rotational speed of the engine is monitored, and the clutch is disengaged when the rotation of the engine has slowed down to a predefined value. In one example, the predefined speed value is below the set idle speed of the engine. The set idle speed of a truck may e.g. be in the interval between 600 to 800 rpm, depending e.g. on if a power take off is used, or on driver preferences.

When the rotational speed of the engine is zero, a signal may be sent to the transmission ECU that the engine has stopped completely. The transmission ECU monitors the rotational speed $t_r$ of the transmission input shaft through a transmission speed sensor 8. When the rotational speed $t_r$ of the transmission input shaft is also zero, the clutch is reengaged again. This will reduce the wear of the release bearing of the clutch.

Normally, the engine and the transmission input shaft will not rotate for the same time period. In some cases, the engine will rotate for a longer time than the transmission input shaft rotates, e.g. when the transmission is cold. In other cases, the transmission input shaft may rotate for a longer time than the engine rotates, e.g. when the transmission is warm. If the transmission input shaft rotates longer than the engine, and for a time exceeding a predefined time interval $t_p$, the rotation of the transmission input shaft is actively reduced by either engaging the clutch slowly and/or partly in order to function as a brake, or by engaging a gear box brake, e.g. a countershaft brake. The predefined time interval $t_p$ may be selected in dependence of various parameters, such as temperature of the engine and/or the transmission, type of gearbox, idle speed of the engine, actual rotational speed of the transmission input shaft, etc. It is however of advantage to set the predefined time interval to a value such that the stop time for the transmission input shaft is equal to or longer than the stop time of the engine, i.e. that the rotation of the engine stops before the rotation of the transmission.

In one example, the rotation of the engine will stop in a few seconds when the engine is warmed up and the idle speed is relatively low, i.e. no power take-off is used. The stop time is thus a few seconds, from the request to shut down the engine to the rotational stop of the engine. In the same example, the stop time for the transmission input shaft may be up to 10 seconds or more when the gearbox is warmed up.

The predefined time interval for the rotation of the transmission input shaft is in this example set to a time slightly shorter or the same as the stop time for the engine. This will reduce the total time for the disengagement of the clutch. When the transmission input shaft has stopped rotating, the clutch is completely reengaged. When the stop time for the transmission input shaft exceeds the predefined time interval, the rotation of the transmission input shaft is actively reduced by engaging either the clutch or a gearbox brake.

If the clutch is used to reduce the rotation of the transmission input shaft, the clutch is engaged in a slow manner and/or to some extent in order to reduce noise from the transmission input shaft. It is e.g. preferred to engage the clutch such that the engine does not start to rotate again, i.e.

such that the inertia of the non-rotating engine is not overcome. Depending on the actual rotational speed of the transmission input shaft, the amount of engagement of the clutch can be adjusted, or the predefined time interval can be adjusted.

If a gearbox brake is used to reduce the rotation of the transmission input shaft, the brake may be engaged in a slow manner in order to reduce noise. One type of gearbox brake is a brake acting on the countershaft of the gearbox. Depending on the actual rotational speed of the transmission input shaft, the speed and/or amount of the engagement of the gearbox brake can be adjusted, or the predefined time interval can be adjusted.

Figure 3:
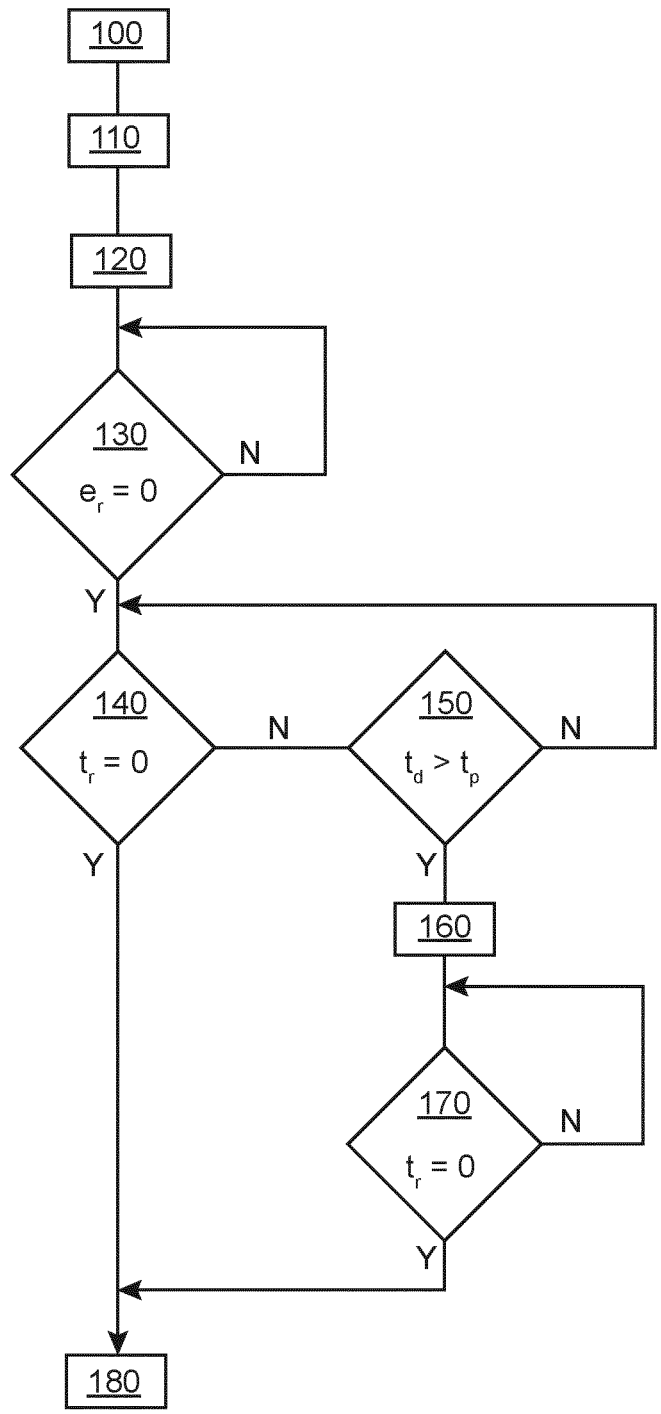
FIG. 3 shows a schematic flow chart of the inventive method.

FIG. 3 shows a schematic flow chart of one example of the method for controlling a clutch in a heavy vehicle comprising an internal combustion engine and a transmission. The method is performed when the engine is shut down. In this example, the engine is warmed up, the rotational speed of the engine is at normal idle speed and the engine will stop rotating before the transmission input shaft. Similar methods may be used for a cold engine/transmission or for other idle speeds.

In step 100, an engine ECU receives a request to shut down the engine. The request may e.g. come from the driver when the driver turns the ignition key or presses a button, or from an external source. In order to perform a shut down of the engine, the gearbox must be in neutral. The request is received at time $t_0$.

In step 110, the clutch of the transmission is disengaged, e.g. by the transmission ECU sending a signal to a clutch actuator that releases the pressure plate of the clutch. The engine is now disconnected from the transmission and the transmission input shaft can rotate independently from the engine.

In step 120, the engine is shut down, e.g. by stopping the fuel supply to the engine.

In step 130, the rotational speed of the engine $e_r$ is measured and it is determined if the rotational speed is zero. If the rotational speed $e_r$ of the engine is not zero, a new measurement is taken until the rotational speed $e_r$ is zero, i.e. the engine has stopped rotating. When the engine has stopped rotating, the method continues with step 140.

In step 140, the rotational speed of the transmission input shaft $t_r$ is measured and it is determined if the rotational speed $t_r$ is zero. If the rotational speed of the transmission input shaft $t_r$ is not zero, the method continues with step 150. When the transmission input shaft has stopped rotating, the method continues with step 180.

In step 150, the actual delay time $t_d$ is compared with a predefined time interval $t_p$. The actual delay time $t_d$ is the time measured from $t_0$, i.e. from the initialization of the engine shut down. If the delay time $t_d$ is less than the predefined time interval $t_p$, a new comparison of the rotational speed of the transmission input shaft is performed in step 140. If the actual delay time $t_d$ exceeds the predefined time interval $t_p$, the method continues with step 160.

In step 160, the rotational speed of the transmission input shaft is reduced actively. In one example, the clutch is used to slow down the transmission input shaft. The clutch is engaged in a slow manner and/or partly, such that the rotation of the transmission input shaft is reduced in a controlled manner. In another example, a gearbox brake is used to slow down the transmission input shaft. The brake is preferably applied in a slow and controlled manner. It is possible to increase the amount of engagement in each iteration, up to a predefined limit.

In step 170, the rotational speed of the transmission input shaft $t_r$ is measured and it is determined if the rotational speed is zero. If the rotational speed of the transmission input shaft $t_r$ is not zero, a new comparison of the rotational speed of the transmission input shaft is performed. When the transmission input shaft has stopped rotating, the method continues with step 180.

In step 180, the rotation of the engine and the rotation of the transmission input shaft are both zero. The clutch can now be reengaged.

In an addition to method step 110, the rotational speed of the engine is monitored, and the clutch is only disengaged when the rotational speed of the engine is below a predefined value. In a preferred example, the predefined speed value is below the set idle speed of the engine. The set idle speed of a truck may e.g. be in the interval between 600 to 800 rpm, depending e.g. on if a power take off is used, or driver preferences.

The invention is not to be regarded as being limited to the embodiments described above, a number of additional variants and modifications being possible within the scope of the subsequent patent claims.

REFERENCE SIGNS

1: Clutch control system
2: Combustion engine
3: Engine ECU
4: Flywheel
5: Clutch
6: Clutch disc
7: Transmission ECU
8: Transmission speed sensor
9: Transmission input shaft
10: Countershaft
11: Countershaft brake
12: Clutch actuator
13: Gearbox
14: Transmission
15: Pressure plate
16: Engine speed sensor
20: Vehicle

The invention claimed is:

1. A system for controlling a clutch in a heavy vehicle comprising an internal combustion engine and an automated mechanical transmission, where the engine is running, the clutch is engaged and the transmission is in neutral, the system comprising an engine speed sensor, a transmission speed sensor, an electronic control unit adapted to receive a request to shut down the engine, to disengage the clutch of the transmission, and to shut down the engine, wherein the electronic control unit is adapted to reengage the clutch when rotation of the engine and rotation of a transmission input shaft has reached zero, and to actively slow down rotation of the transmission input shaft by the use of a brake device if a stop time for the transmission input shaft exceeds a predefined time interval.

2. System according to claim 1, wherein the clutch of the transmission is disengaged when the engine speed is below a predefined value.

3. System according to claim 2, wherein the predefined engine speed value is below a set idle speed of the engine.

4. System according to claim 1, wherein the transmission comprises two clutches arranged in parallel.

5. System according to claim 1, wherein the brake device is the clutch.

6. System according to claim 1, wherein the brake device is a gearbox brake.

7. Vehicle, comprising a clutch control system according to claim 1.

8. A method for controlling a clutch in a heavy vehicle comprising an internal combustion engine and an automated mechanical transmission, where the engine is running, the clutch is engaged and the transmission is in neutral, comprising the following steps:
- upon receiving a request to shut down the engine,
- disengaging the clutch of the transmission,
- shutting down the engine,
- monitoring a rotational speed of the engine,
- monitoring a rotational speed of transmission input shaft,
- if a stop time of the transmission input shaft exceeds a predefined time interval, then actively slowing down the transmission input shaft until the rotational speed of the transmission input shaft is zero, and
- reengaging the clutch completely when the rotational speed of the engine and the rotational speed of the transmission input shaft is zero.

9. Method according to claim 8, wherein the predefined time interval is less than the stop time of the engine.

10. Method according to claim 8, wherein the predefined time interval corresponds to the stop time of the engine.

11. Method according to claim 8, wherein that slowing down the transmission input shaft by the use of the clutch.

12. Method according to claim 8, wherein slowing down the transmission input shaft is by the use of a gearbox brake.

13. Method according to claim 8, wherein the clutch of the transmission is disengaged when the engine speed is below a set idle speed of the engine.

14. A computer program comprising program code for performing all the steps of claim 8 when said program is run on a computer.

15. A computer program product comprising program code stored on a computer readable medium for performing all the steps of claim 8 when said program product is run on a computer.

\* \* \* \* \*